United States Patent [19]

McNab

[11] Patent Number: 4,771,611
[45] Date of Patent: Sep. 20, 1988

[54] AIR CONDITIONING MEANS AND METHOD

[75] Inventor: John L. G. McNab, Myrtle Bank, Australia

[73] Assignee: Dricon Air Pty Limited, Caringbah, Wales

[21] Appl. No.: 43,028
[22] PCT Filed: Aug. 29, 1986
[86] PCT No.: PCT/AU86/00254
§ 371 Date: Apr. 23, 1987
§ 102(e) Date: Apr. 23, 1987
[87] PCT Pub. No.: WO87/01436
PCT Pub. Date: Mar. 12, 1987

[30] Foreign Application Priority Data

Aug. 30, 1985 [AU] Australia ............................ PH02220

[51] Int. Cl.[4] ............................................... F28D 5/00
[52] U.S. Cl. ....................................... 62/311; 62/324.1; 165/3
[58] Field of Search ................. 62/304, 311, 91, 324.1; 165/3, 8, 39, 60, 104.34, 909

[56] References Cited

U.S. PATENT DOCUMENTS

| 2,700,537 | 1/1955 | Pennington | 165/3 X |
| 2,807,258 | 9/1957 | Pennington | 165/3 X |
| 3,220,212 | 11/1965 | Fordsmand | 62/311 X |
| 3,859,818 | 1/1975 | Goettl | 62/311 |
| 3,877,244 | 4/1975 | Di Peri | 62/311 X |
| 3,926,249 | 12/1975 | Glancy | 165/3 |
| 3,964,268 | 6/1976 | Di Peri | 62/304 X |
| 4,429,735 | 2/1984 | Namaguchi et al. | 62/311 X |

FOREIGN PATENT DOCUMENTS

| 102372 | 11/1937 | Australia . |
| 202681 | 12/1955 | Australia . |
| 52-10435 | 1/1977 | Japan . |
| 55-61916 | 5/1980 | Japan . |
| 1071887 | 7/1984 | U.S.S.R. . |

Primary Examiner—Lloyd L. King
Attorney, Agent, or Firm—Brown, Martin, Haller & Meador

[57] ABSTRACT

An air conditioner wherein supply air is first passed through the supply air passages of an air-to-air heat exchanger, then over a first refrigerant-to-air heat exchanger, into the space to be air conditioned, and return air from that space is passed throught the air-to-air heat exchanger, through a second refrigerant-to-air heat exchanger, and discharged to atmosphere, the refrigerant heat exchangers being the condenser and evaporator of a closed refrigeration system driven by a heat pump compressor.

15 Claims, 4 Drawing Sheets

AIR CONDITIONING MEANS AND METHOD

This invention relates to an improved means and method of cooling, heating and humidity changing of air for achieving controlled air-conditioning of a space; for example in a dwelling, office, restaurant, hospital, factory or warehouse, which enables substantial energy savings to be made over that required by prior traditional technology in heat pumps.

In this text the title "heat pump" is used in the general sense of any refrigeration system which can be used to provide air-conditioning depending on whether the cooling means, humidity control means or heating means is in the supply air stream. "Supply air" is the air that enters the space being air conditioned after passing through the aforementioned means. "Return air" is the air that leaves the space and passes through the aforementioned means.

Depending on the embodiment, this invention can provide control of both air humidity and temperature while cooling or heating, whilst at the same time providing high ventilation rates to maintain required indoor air quality and air movement.

BACKGROUND OF THE INVENTION

The principal objective of an air-conditioning system for human occupancy in buildings is to provide a controlled comfortable and healthy indoor environment. Other objectives of an air-conditioning system can be to provide for the special requirements of storage, processes or equipment operation within a building.

The fundamental variables for an air-conditioning system to control in a defined indoor zone are air temperature, air humidity, air movement and air quality.

The work of scientists has shown that human comfort (also called thermal acceptability) is achieved, when the values of air dry bulb temperature, mean radiant temperature, humidity and air movement conform to a defined relationship called a "comfort equation".

This equaltion also incorporates the additional variables of human activity and clothing level.

Comfort indoors or other required conditions are achieved by the invention described herein by controlling air dry bulb temperature, humidity and air movement in the occupied space.

An advantageous characteristic of the invention when used for cooling particularly in comfort applications is the ability to provide a larger supply air quantity at higher dry bulb temperature while maintaining dehumidification but without the energy penalty associated with traditional heat pump systems attempting the same process and thereby reducing their dehumidifying capacity. The advantages in this characteristic of the invention are threefold and interrelated. They are:

(1) By increasing supply air quantity (over that traditionally used) and thereby permitting higher air dry bulb temperature (than traditionally used) while being able to provide comfort conditions in accordance with the aforementioned "Comfort Equation". In ASHRAE Standard 55-1981, the relationship between air movement, air dry bulb temperature and comfort is shown to be such that an increase in air movement of 0.275 m/s would allow an increase in air dry bulb temperature of 1° K. for the same comfort condition. The subject invention readily allows an increase of 2° K. for the same comfort conditions, (i.e. an increase in air movement of 0.55 m/s).

(2) By increasing supply air dry bulb temperature there is a reduction in the heat transmission through the building envelope as a result of the smaller temperature difference between outside and inside the building. The quantity of heat transmitted is directly related to this temperature difference thus the lower the heat quantity the less energy is required in the cooling system to extract it from the building.

(3) By increasing the supply air temperature (above that traditionally used) damage to internal building surfaces which frequently occurs in tropical climates can be avoided. It is often unavoidable that the supply air, as it enters the occupied space through the distribution system, impinges directly on internal wall or ceiling surfaces. If this impingement occurs prior to mixing with or entraining inside air to thereby, in turn, raise the mixed temperature above dew point temperature, then the building surface can become cold enough for moisture to condense on it and cause damage by staining and increase in mass leading to structural failure.

An associated problem occurs if the supply air temperature has, at the same time, such a low dew point temperature that it reduces the vapour pressure of the moisture inside the building surface and thus draws moisture through the surface from the higher vapour pressure outside. Suitably positioned moisture impervious materials can prevent these problems of building damage but are costly to install.

These damaging conditions occur with traditional heat pump systems that are unable to prevent an unnecessarily low level of humidity in the supply air discharged.

The subject invention, by allowing higher temperature in the supply air and by preventing an unnecessarily low humidity in the supply air, positively prevents the problems described above that occur particularly in tropical climates. It will be realised also that to have too low a humidity can cause other occupational dangers such as the generation of static electricity and an increase in respiratory disease.

Indoor air quality for providing a healthful environment has recently received considerable scientific attention since numerous types of illness have been attributed to indoor air contamination.

Recent studies have not only identified and quantified new indoor polluting materials and their effects but also have more closely examined traditional pollutants such as from cooking, smoking and naturally occurring radio-active radon gas as well as disease causing organisms.

New pollutants are principally formaldehyde, chlorinated organic chemicals, asbestos fibre and combustion products. Some of these indoor generated contaminants can be toxic and carcinogenic.

On the other hand, outdoor air in most environments is low in all contaminants since much community effort and legislation has been aimed at maintaining that condition. Ventilation by outside air is very effective in removing indoor generated pollution and to provide oxygen make-up.

Generally, outside air needs only simple filtration to achieve a suitable quality for ventilation purposes. The removal of indoor generated pollutants other than by dilution or replacement is generally a difficult and costly chemical process and is rarely justified unless the energy cost of heating and cooling outside sourced ventilation air is excessive.

The invention described herein greatly reduces the energy required for heating and cooling ventilation air and obviates the need to consider indoor air treatment except for applications in unusually polluted environments.

PRIOR ART

Very little prior art is known to the applicant, the nearest being U.S. Pat. No. 3,926,249 GLANCY. GLANCY makes use of heat exchangers comprising coils containing water interconnected by means of conduits and pump so that advantage can be taken of the differential between intake and exhaust air temperatures. GLANCY also discloses use of water sprays to cool condenser heat exchangers in addition to the cooling which is effected by the heat exchanger containing the circulated water.

OBJECTIVES OF THE INVENTION

The objectives of this invention are to significantly reduce the disadvantages of existing technology in heat pump air-conditioning systems. Some of these heat pump system disadvantages are:

(a) The high energy penalty incurred in providing sufficient ventilation air to ensure an acceptable healthy indoor environment for both heating and cooling.

(b) The lack of control of humidity that is typical of traditional air conditioning systems unless reheating of the supply air after cooling is sued. Supply air reheat systems, as a first step, add extra energy to cool the supply air to a lower than necessary dry bulb temperature in order to reduce the humidity and then, as a second step, add energy to heat the supply air to the required dry bulb temperature. Both steps are wasteful of energy. Reheat systems using heat rejected from the heat pump are costly to install and difficult to control. The control of the lower limit of humidity requires extra humidifying equipment to add moisture vapour to the supply air. Such equipment requires the addition of extra energy, usually direct electrical, and is thus energy inefficient. Reheating and humidifying systems are costly both to install and operate.

(c) The high condensing temperatures in air cooled heat pumps during peak cooling demand. These cause excessive energy consumption and performance fall off. Cooling performance reduces as ambient air temperature increases and since ambient air is at highest temperature when cooling need is greatest for most applications particularly in hot climates, energy consumption is highest under these conditions.

(d) The failure of air source heat pumps to heat efficiently in ambient air temperatures of about 6° or less is due to ice forming on the heat exchanger coils. This causes a need to provide high energy consuming electric heating elements or alternative heating means to make up for the heat pump performance reduction. Performance needs to be greatest when ambient temperatures are lowest in most applications.

(e) The need in water cooled heat pumps during cooling to require extra equipment such as cooling towers to provide a continuous supply of cool water at suitable temperature for condensing. This increases the cost of the installation.

(f) The need in water source heat pumps used for heating supply air, to require extra equipment such as storage tanks and solar heat exchangers. Alternatively a stream or pond that is always above about 6° is required from which heat can be extracted without it freezing.

BRIEF DESCRIPTION OF THE INVENTION

The subject invention is an improved air conditioning means and method which performs as either a cooling or heating system including functions of dehumidification and humidification as are appropriate to achieve the required condition of air within an enclosed space or zone.

The subject invention comprises at least the following three heat exchanger components with (1) acting in series relationship with each of components (2) and (3).

Component (1) is an air to air energy exchanger of a type for exchanging enthalpy between two air streams either as sensible heat only or both sensible and latent heat by means of temperature change alone or combined with the condensation or evaporation of water within either of the two air streams in or adjacent to the heat exchanger passages. Examples of such a heat exchanger are fixed plate heat exchangers, rotary heat exchangers, and heat pipes, thermosyphon or coil loop systems.

Component (2) is an air to refrigerant energy exchanger for transferring energy either as sensible heat or sensible and latent heat between an air stream and a liquid, vapourous or gaseous refrigerant, which may consist of water, glycol, ammonia and various halogenated compounds as well as refrigerant-absorbent materials. Examples of this heat exchanger are bare pipe, finned coils and hollow plates.

Component (3) is an air to refrigerant energy exchanger for transferring energy between an air stream either as sensible heat only or as sensible and latent heat when water is added to the air stream and a refrigerant such as those set out for component (2) including the examples listed therein.

The principal characteristic of this invention is the method and means of firstly exchanging enthalpy in an energy exchanger as described in component (1) between one stream of air called the primary air stream an another stream of air called the secondary air stream and then causing one of the said streams of air to have its enthalpy further increased or reduced by passing it through an air to refrigerant energy exchanger as described in component (2) and the other said stream of air to have its enthalpy further reduced or increased by passing it through an air to refrigerant energy exchanger as described in component (3). During the passing of the said air streams through the energy exchangers described as components (1), (2) and (3) water may be introduced to one or other or both said air streams so as to be evaporated in order to change the humidity of said air stream and where appropriate change the temperature.

In a typical embodiment of the subject invention the said primary air streams are referred to as supply air while the said secondary air stream is referred to as return air.

More specifically, the invention consists of air conditioning means comprising a heat pump and two heat exchangers in a closed refrigeration system, and an air-to-air heat exchanger, said heat exchangers being connected in series with respect to air flow, and air impeller means to impart said air flow, the first of said heat exchangers being said air-to-air heat exchanger having a supply air flow path and a return air flow path, the second and third of said heat exchangers being refrigeration-to-air exchangers of said system, such that, in use, said air impeller means causes an air flow through said supply air flow path of the first heat exchanger, then through the second heat exchanger and through a space to be air conditioned, from which some at least of return air flows through said return air flow path, through said third heat exchanger, and exhausts to atmosphere.

Among the many possible modes of operation of this invention some provide the following functions:
(a) Cooling of supply air without dehumidification or humidification.
(b) Cooling of supply air with dehumidification.
(c) Cooling of supply air with humidification.
(d) Heating of supply air without humidification.
(e) Heating of supply air with humidification.

Each of the functions (a) to (e) inclusive can be combined with other functions such as air filtration into more complex embodiments able to provide, as required, some or all of the said functions at the same time, if logical, or separately as is appropriate for the air conditioning application being considered.

Each of said modes can be arranged for the supply air either to be partly air drawn from the space (called recycled air) and mixed with air drawn from outside the space (called outside air) or to be air entirely composed of outside air or air of suitable condition drawn from another appropriate source other than from the building.

One embodiment that has been found to be highly appropriate to many air conditioning applications in which only cooling and dehumidifying are required is one in which all the supply air is from outside the building and no building air is recycled through the means back into the building. In this embodiment the air to air energy exchanger component (1) is a cross flow air to air plate exchanger, the energy exchanger component (2) is an air-to-refrigerant heat exchanger of the finned coil type, and the energy exchanger component (3) is also an air-to-refrigerant heat exchanger of the finned coil type and wherein components (2) and (3) there is circulated an halogenated refrigerant of which R12 and R22 are reference designations of suitable types.

In this embodiment the refrigerant is circulated through the components (2) and (3) by a compressor which draws in refrigerant gas which has evaporated in component (2) and after compressing the gas it discharges it into component (3) in which the refrigerant gas is condensed to a liquid.

This refrigerant liquid is then delivered through a metering device into component (2) in which the liquid refrigerant evaporates before again being drawn through the compressor and recycled with the closed piping circuit.

The action of evaporation of the refrigerant in component (2) is to reduce its surface temperature over which the supply air passes thereby reducing the air dry bulb temperature and if the surface temperature is below the supply air dew point temperature then dehumidification will also occur.

The action of the compressed and condensing refrigerant in component (3) is to raise its surface temperature over which the exhaust air from the building passes and into which heat energy is passed as it is maintained at a lower temperature than the heat exchanger surfaces by having been evaporatively cooled by the addition of water to it as it passes through the plate heat exchanger component (1) and after it leaves component (1) and before and after it enters component (3).

Since the building space has its temperature and humidity being controlled by the cooling and dehumidification operation of the embodiment of the subject invention then the return air from the building space is at a relatively low enthalpy and wet bulb temperature compared to outside air. The process of evaporating water into such return air as it enters component (1) causes its dry bulb temperature to approach more closely to its wet bulb temperature. As water continues to be evaporated into the return air as it passes through component (1) there is by virtue of temperature differences a cooling effect to the supply air as it also passes through component (1). This cooling effect may be such as not only to reduce the dry bulb temperature of the supply air but also to cause dehumidification.

The supply air then passes through the component (2) in which it is able to be further cooled and dehumidified as is required for the air conditioning of the space in the building.

As part of the preferred embodiment of this invention it is advantageous for the water that is evaporated into the return air to be part of a flow of water than is recycled from a collecting tank.

It is also a part, but not necessarily an essential part, of the invention as described in this embodiment that the water that is formed from dehumidification of the supply in either or both of the components (1) and (2) is allowed to pass into the said collecting tank. By this means both energy and water are saved by taking advantage of the low enthalpy level of the water from dehumidification as replacement for evaporated water in place of water from normal supply mains which is typically at a relatively high enthalpy level. It has also been found in practice that the water from dehumidification contains less impurities and salts and thus reduces the need to control these factors in the typical water supplies.

Another energy saving advantage of the invention as shown in this embodiment is that there is allowed a relatively low temperature and pressure in the condensing refrigerant due to the use of the low temperature of the evaporatively cooled return air from the building rather than air that is from outside. The lower the refrigerant condensing temperature and pressure the less is the energy required by the compressor.

Another energy saving advantage of the invention as shown in this embodiment is that the operation of the air to air energy exchanger component is to lower the enthalpy of the supply before it enters the energy exchanger component (20 below that which is experienced in traditional heat pump systems and this allows a relatively high temperature and pressure in the evaporating refrigerant in component (2). The higher the refrigerant evaporating temperature the less is the energy required by the compressor.

Another energy saving advantage of the invention is allowed by causing the return air stream to have a lesser flow than the supply air stream. The optimum of this flow imbalance has been found to be related to the air tightness of the building structure. In typical buildings such as residences the imbalance is found in practice to be optimum at a ratio of between 1.1 to 1.0 and 1.25 to 1.0 of supply air to return air. It should be understood that such imbalance causes a pressurisation of the building which significantly offsets the undesirable infiltration of untreated outside air.

An analysis of the psychrometric changes in the air streams in this embodiment of the invention shows that on the one hand infiltration results in a requirement of a significantly lower evaporating temperature in component (2) (or any heat pump) than would otherwise be needed in cooling mode, while the effect on the performance of the embodiment as a whole due to the air flow imbalance is negligible due to the effect of the water evaporation in the return air water having such a high heat of vapourisation.

In the operation of this embodiment of the invention it is found that a feature of the invention giving further energy saving is that the refrigerant system in components (2) and (3) need only be run when the humidity of the space as represented by the return air as it leaves the building to enter component (1) is above the required level. The invention allows temperature control to be maintained even when the refrigerant system in components (2) and (3) is not required to operate due to the humidity in the space being at acceptable level. In most climate areas there are significant periods when ambient humidity levels are low enough to enable the invention to operate as an open cycle refrigeration or indirect evaporative cooling system in component (1) without the closed cycle refrigeration system in components (2) and (3) being operative thus giving considerable energy savings. The traditional heat pump system would need to operte whenever temperatures were above acceptable levels and such systems have been shown to require over three times as much energy as does an efficient open cycle refrigerant or indirect evaporative cooling system when humidity is at an acceptable level.

A further energy saving advantage of the invention is that it provides a higher ventilation rate than do traditional systems which require considerable extra energy consumption to cool and provide dehumification of typical ventilation air.

While the embodiment just described does not provide for any building air to be recycled it must be understood that the invention can be operated wherein a part of the building air is recycled by mixing with the outside air to form the supply air. Clearly the invention is inapplicable when the supply air comprises only recycled air.

In applications in which it is appropriate to recycle some building air it may also be found to be appropriate to introduce outside air into the return air stream to make up the quantity of air needed for the refrigerant condensing in component (3).

It has been found in the practical application of the invention that the recycling of building air is rarely warranted for the purpose of maximising energy saving and in the embodiment described it has been found from performance testing that the overall energy saving in typical applications such as cooling a residence that energy savings of more than 45% are achieved in tropical climates and more than 65% are achieved in temperate climates when directly compared with typical commercially available air cooled heat pumps.

A variation to the embodiments previously described is to provide for an arrangement whereby the refrigerant circuit can be reversed for operation under cold ambient conditions. In this embodiment refrigerant valves are included which cause components (2) and (3) to exchange functions and thereby cause the supply air to be heated instead of cooled. In this variation of the embodiment the water circulation in the return air does not operate unless the water can be efficiently heated by an outside source.

It can be seen that the return air in passing through the air to air energy exchanger component (1) firstly rejects heat into the supply air and then rejects more of its energy into the air to refrigerant energy exchanger component (3) which in this mode is operating as a refrigerant evaporator.

By comparison of performance of the subject invention in heating mode with traditional reverse cycle heat pump systems it has been shown that the outside air temperature at which ice commences to form on the component (3) surfaces and lowers its heat exchange performance is typically 5° below the first ice forming stage in traditional heat pump system. This depression of frosting temperature of outside air before icing commences enables significant energy savings in many climate areas when there are long periods below 7° C.

DETAILED DESCRIPTION OF THE DRAWINGS:

Figure 1:
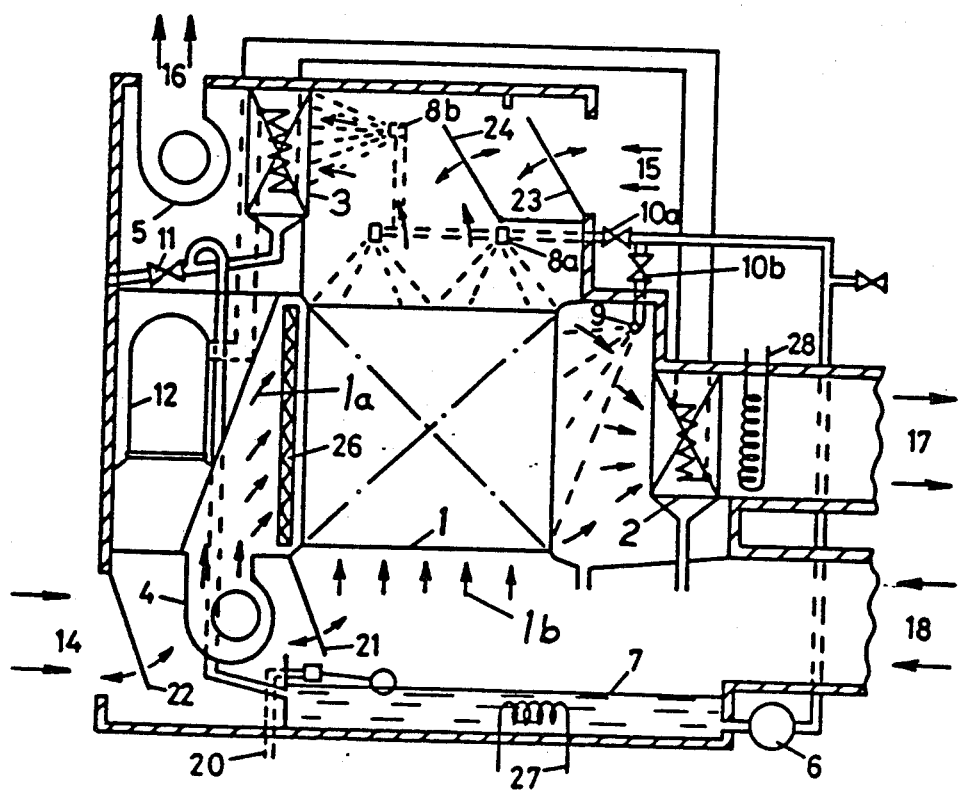
Figure 2:
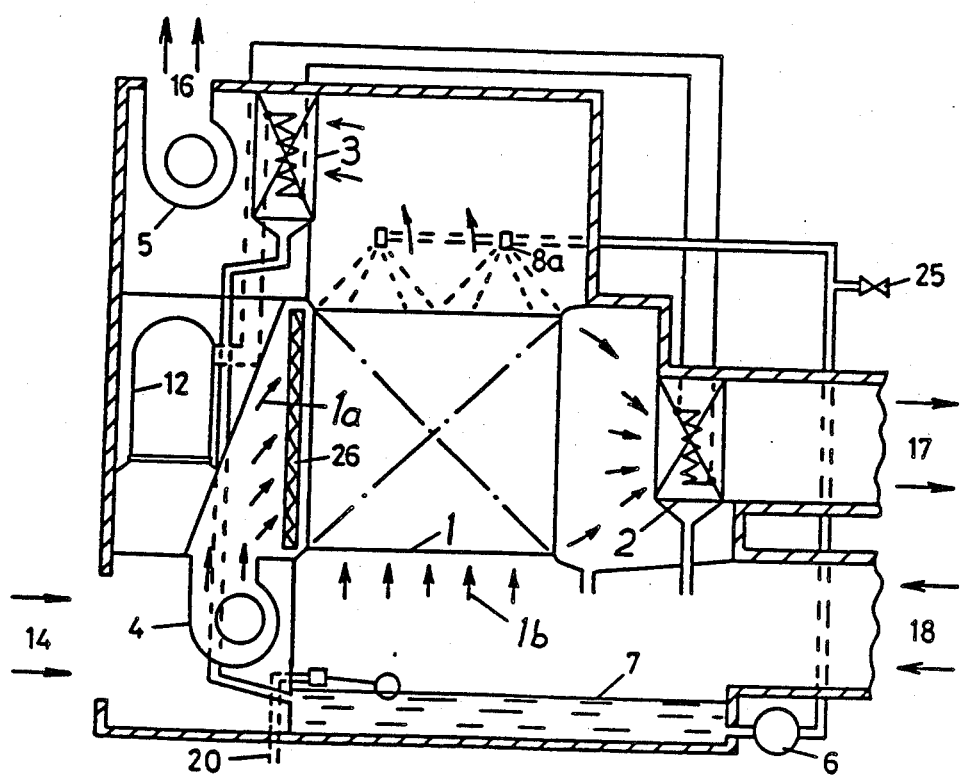
Figure 3:
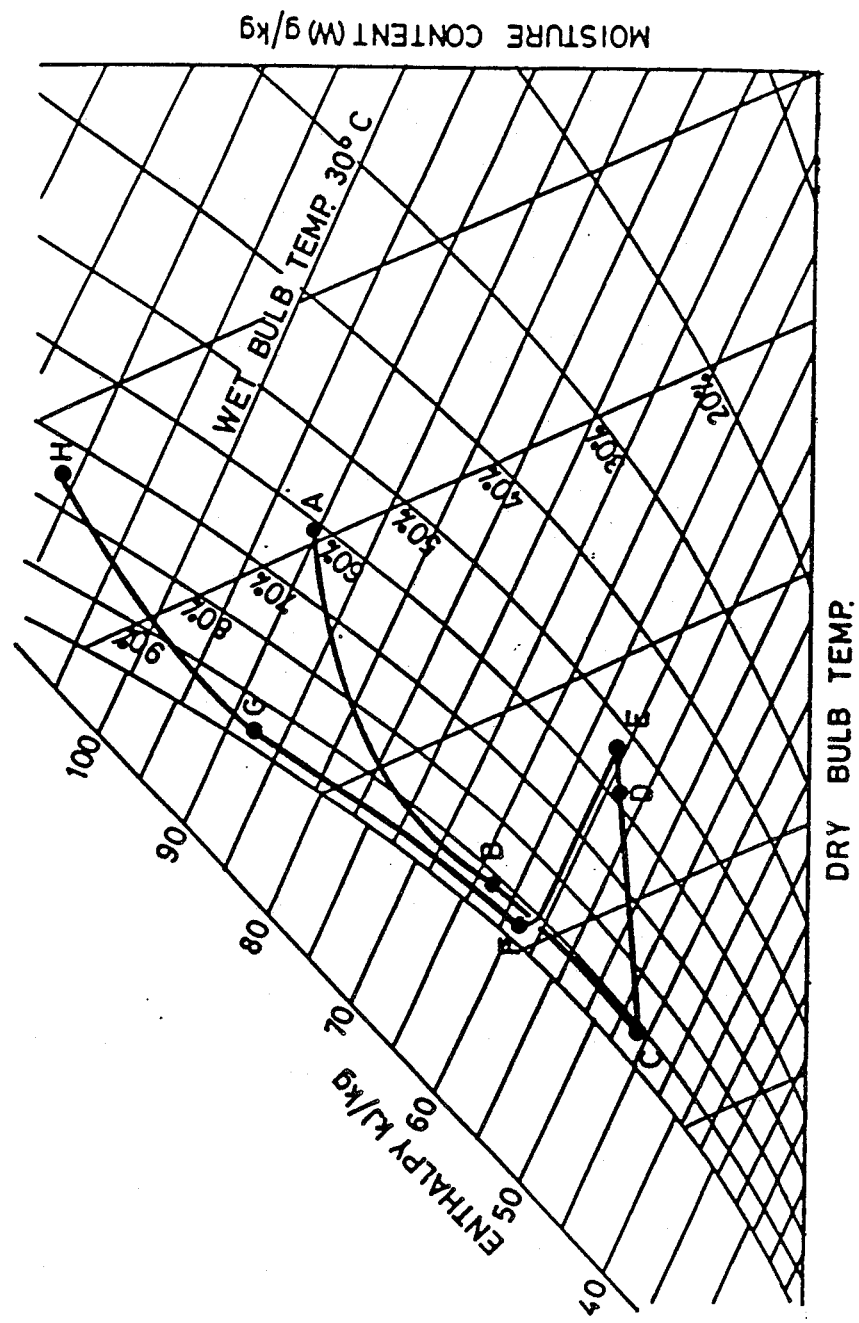
Figure 4:
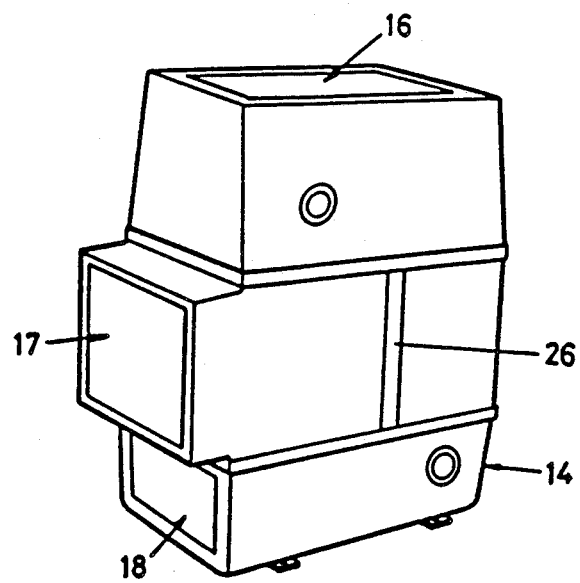
Figure 5:
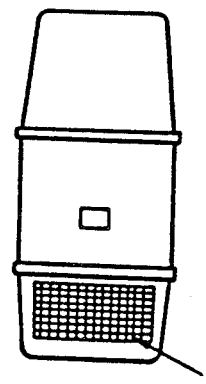
Figure 6:
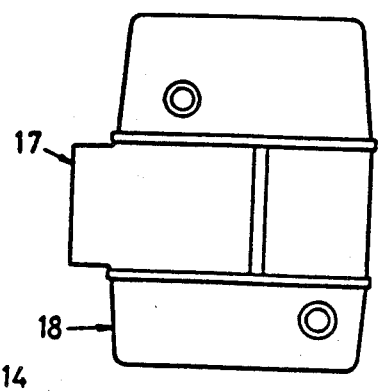
Figure 7:
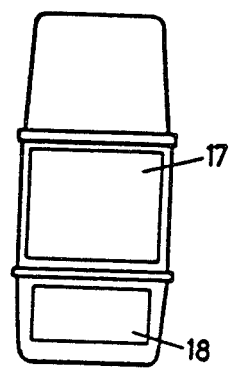

Embodiments of the invention are described hereunder in some detail with reference to, and are illustrated in, the accompanying drawings, in which:

FIG. 1 is a diagrammatic representation which shows an air conditioner according to a first illustrated embodiment when arranged in a cooling mode, FIG. 2 is a diagrammatic representation which shows an air conditioner according to a second illustrated embodiment also arranged in a cooling mode, FIG. 3 is a psychrometric chart, FIG. 4 is a perspective view of an air conditioner according to the invention, FIG. 5 is an end elevation thereof, FIG. 6 is a side elevation, and FIG. 7 is the other end elevation.

DETAILED DESCRIPTION OF THE DRAWINGS

In the drawings, FIG. 1 is a diagrammatic arrangement of a first embodiment of the invention, in which the following functions can be performed (partly simultaneously) depending on the appropriateness of so doing for achieving the condition of supply air required:

(a) Delivery of supply air which is either all outside air or part outside air and part recycled return air.

(b) Extraction of exhaust air which is either all return air or part return air and part outside air.

(c) Cooling of supply air by indirect water evaporation using return air and with or without cooling by heat pump whereby the cooling by both or either means may include dehumidification.

(d) Cooling of Supply air by indirect water evaporation using return air and with or without cooling and dehumidification by direct water evaporation or dehumidification by air washing.

(e) Heating of supply air by heat recovery from return air and with or without heating by heat pump 12 and with or without heating by electric elements, hot water coils or other suitable heating means.

(f) Heating of supply air by heat recovery from return air and with or without heating and/or humidification by water spray and with or without heating by heat pump and with or without heating by electric elements, hot water coils or other suitable source.

(g) The filtration of supply air.

Supply air is passed through primary air path 1a of heat exchanger 1 and then through coil 2 while return air is passed through secondary air path 1b heat exchanger 1 and then through coil 3.

Fan 4 moves the supply air and fan 5 moves the return air.

Pump 6 circulates water from sump 7 to spray in distributors 8a, 8b and 9 via control valves 10a and 10b respectively. Water drains by use of drain control valve 11 to outside unit or to sump 7.

Compressor 12 circulates refrigerant through coils of heat exchangers 2 (evaporator) and 3 (condenser), when in the cooling mode (as herein described).

Outside air enters at lower and upper ports 14 and 15 and return air discharges at outlet port 16 while supply air leaves the air conditioner through duct 17, to the space to be conditioned, and return air from that space returns through duct 18.

Make up water enters through inlet pipe 20. (Drain or overflow not shown).

Air valve 21 controls quantity of return air which is bled back into supply air for recirculation. This is normally limited to use in the heating mode. Air valve 22 controls quantity of outside air introduced into the supply air. Air valve 23 controls quantity of outside air passing through coil 3, also limited to use in the heating mode.

A water inlet valve 25 controls water bleed to limit concentration of undesired solids in the water.

Air filter 26 provides for particulate contaminant control.

Coil 27 provides heating or cooling input to the water for the humidification or dehumidification process. This can for example be an electric element or steam or hot water coil or refrigerant cooled (or heated) coil.

Heater 28 provides heat input to the supply air under conditions when the refrigerant system has insufficient capacity for example when very low outside air temperatures cause icing up of coil 3. This heating can for example be from electric or steam or hot water or other suitable source.

FIG. 2 is a diagrammatic arrangement of a second illustrated embodiment of the invention, but wherein the following functions can also be performed partly simultaneously depending on the appropriateness of so doing for the achieving of the condition of supply air required especially in tropical climates:
(a) Delivery of supply air which is all outside air.
(b) Extraction of exhaust air which is all return air.
(c) Cooling of supply air by indirect water evaporation using return air and with or without cooling by heat pump whereby the cooling by both or either means may include dehumidification.
(d) Filtration of supply air.
(e) Heating of supply air by heat recovery from return air, with or without heating by heat pump 12.

The hardware of FIG. 2 will be seen to be substantially similar to that of FIG. 1, but simplified for the purposes of description. Similarly elements are identified by the same designation numbers.

Air valves 21, 22, 23 and 24 can be used to regulate the amount of recycled air and outside air and the mixtures thereof that pass through the equipment.

The following is a brief summary of operation of the arrangement illustrated in FIG. 2, when in its heating mode:

Air flow fan 4 delivers air through the primary air flow path 1a of energy heat exchanger 1.

Water should be added to the primary air flow from distributor sprays 9, if needed to increase humidity. (See FIG. 1).

Whereas in the first embodiment the energy heat exchanger 2 was the evaporator coil of heat pump compressor 12, in the second embodiment coil 2 is operated as the condenser coil, and coil 3 as the evaporator coil. Since the valve configuration to achieve this is the same as is commonly used in reverse cycle air conditioners, it is not herein illustrated. The air is heated by coil 2 and thereby reduces the refrigerant temperature and improves coefficient of performance of heat pump 12. The heated air passes through duct 17 to the space to be air conditioned, and the return air from that space through the secondary air path 1b of the air-to-air heat exchanger 1. This preheats the primary air flow, but the (still warm) return air flows over coil of heat exchanger 3 (operating in its evaporator mode) and reduces likelihood of ice formation on that coil, as well as improving the coefficient of performance of heat pump 12 by raising the refrigerant temperature. Fan 5 discharges the return air to atmosphere through outlet port 6 as in the first embodiment.

Details of more specific operating conditions are described more fully below.

It should be understood from the drawings that many embodiments could be provided utilising various combinations of components of FIGS. 1 or 2 to achieve the functions most appropriate for a particular application under specified climatic conditions.

It should also be understood that while the drawings illustrate an air-conditioning system in which all the functions are arranged largely within one housing the invention could as well be illustrated by having the components and functions arranged into separate housing.

FIGS. 4, 5, 6 and 7 illustrate a typical air conditioner from several views which represents an embodiment of the invention in which all components are compactly arranged in one housing.

In the preferred embodiments the design of the air to air energy exchanger component (1) in FIGS. 1 and 2 is of a type described in Australian Pat. No. 425,702 and U.S. Pat. No. 4,263,967 by the same inventor as subject invention which comprises a stack of plates which are divided into multi-cavity conduits by closure means on the opposite edges of adjacent plates, such closure means between any pair of adjacent plates being on alternate edges to the next pair of adjacent plates. Thus the conduits are arranged so that the two fluid flows can be separated from one another by the plates and closure means on the edges of the plates and thus permit heat exchange through the material of the plates between the fluid flows.

The material of component (1) is a non-toxic thermoplastic type with high resistance to attack from the fluids or to self breakdown. Since the plates are quite thin and the thermal resistance of the material is low relative to the thermal resistances of the films of the fluid flows on the plate surfaces, and excellent overall heat transfer is obtained in comparison with other forms of heat exchanger.

The air-to-refrigerant heat exchangers (2) and (3) are of construction typical of those used in traditional air conditioning systems in which metal fins are fixed to metal tubes and such fins and tubes are sized and spaced to optimise the balance between minimising resistance to the fluid flows and maximising energy exchange between the fluids.

The other components of the preferred embodiment include fans, pump and compressor and are typical of those used in traditional air conditioning systems and are selected for optimum efficiency for the temperatures and pressures of the fluids concerned.

DETAILED DESCRIPTION OF PERFORMANCE

(1) COOLING AND DEHUMIDIFICATION OPERATION

Dehumidification is required when the sum of the absolute humidity of the supply air from outside the building and the gain in absolute humidity generated within the space resulting from indoor activities equals or exceeds the design value for absolute humidity required within the space.

When dehumidification is not required components (1), (6) and (8) in FIGS. 1 and 2 operate in conjunction with components (4) and (5) as open cycle refrigeration alone (when FIG. 2 is in its cooling mode).

When dehumidification is required the additional components (2), (3) and (12) operate as closed cycle refrigeration in combination with the open cycle refrigeration as shown in FIGS. 1 and 2.

The combination of these processes is shown in cooling mode for a typical tropical performance on psychrometric chart FIG. 3 in which the processing of the supply air being all from outside is represented by A B C D. A is the condition of the outside air and D is the condition within the occupied space in the building, and E is the condition of the return air entering the equipment.

Line E F G H represents the processes of the return air from the occupied space until it is discharged to outside the building at condition H.

The coincident processes for the supply and return air which take place within component (1) are shown on FIG. 3 by process lines AB and FG respectively in adjacent passages of heat exchanger (1).

The return air after leaving the duct at condition E enters the equipment through duct 18 on FIG. 1 and is wetted by recycled water from spray (8) which falls from component (1) into collecting sump (7). This wetting of the return air in the chamber between component (1) an sump (7) and on the surfaces at the entrance to component (1) causes the return air to become nearly saturated (typically over 90%) and this is accompanied by a reduction in temperature nearly to its wet bulb temperature as represented by condition point F. The return air continues to be wetted and near saturation as it passes through component (1) and until it leaves at condition G. By this means it is always maintained at a lower temperature then the supply air which is adjacent to it in the alternate separate passages.

The supply air in a typical tropical climate application enters component (1) at condition A. It then enters component (2) at condition B and which it leaves at condition C again nearly saturated to leave the equipment at (17) and enter the building.

The supply air mixes with the air in the building space to form condition D thereby taking up the heat and moisture being developed within the space.

The process line DE represents the heat gained by the space air as it is returned in the duct system before entering the equipment at (18).

The return air after leaving component (1) at condition G enters component (3) by passing through sprays (8a) and (8b) the latter of which are arranged to wet the surfaces of component (3). By this means a low temperature is maintained in the return air due to its continued humidification as its passes through component (3) and leaves at condition H for discharge outside the building.

It will be noted that:

(a) The processes on FIG. 3 are typical of a tropical climate and numerous other situations can be described which have different process lines but which likewise demonstrate considerable savings in energy while at the same time provide high levels of outside air to the building without energy penalty.

(b) The mass flow rates of the supply air to the return air can be up to 1.2:1.0 with negligible effect on overall performance while at the same time offsetting the infiltration of the hot outside air by pressurising the building.

(c) The moisture removed as condensate from the supply air during the dehumidification stages in the example illustrated in FIG. 3 is collected in the sump for recycling through the exhaust air and thus increases the overall thermal efficiency. This condensate typically provides about 60% of the water supply to make up for evaporation. It also maintains a low level of impurity in the water since the condensate is virtually pure.

(d) The thermal condition and wetting of the return air as it passes through the components (3) and into which is being transferred the heat from the closed cycle refrigeration condenser allows a significantly lower condensing temperature than can be achieved with ambient air as is used by air cooled traditional systems.

(e) The thermal condition of the supply air entering the component (2) being close to saturation allows a higher temperature of refrigerant within the coil as the resistance to heat flow of a fully wetted heat exchanger such as this than applies to the partially dry traditional system.

The following is a brief summary of the advantages achieved in the cooling and dehumidification operation described above:

(a) Provisions of higher than traditional ventilation rates without energy penalty.

(b) Lowering of infiltration due to pressurisation.

(c) Capturing of condensate from dehumidification reduces energy loss, raises water purity and reduces water usage.

(d) Lower refrigerant condensing temperature combined with high evaporating temperature of refrigerant reduces energy consumption of the compressor for the same refrigeration effect.

These advantages are all based on well established principles of thermodynamics and psychrometrics.

In addition to these advantage of the subject invention is the overall benefit of being able to provide very efficient cooling with the compressor needing to operate during periods when humidity is low enough. This can be for quite lengthy periods even in tropical climates.

(2) HEATING AND HUMIDIFICATION

The following is a detailed description of operation for heating and humidification:

In this operating mode the preferred embodiment described for cooling and dehumidification has the refrigerant flow direction changed by valves (not shown in drawings) to cause component (2) to be a refrigerant condenser giving up its heat to the supply air and component (3) to be a refrigerant evaporator taking in heat from the return air tha passes through it.

Traditional air source heat pumps operating as reverse cycle supply air heaters have outside ambient air passing over the refrigerant evaporators. In climates that experience ambient temperatures below 7° ice commences to form on the surfaces of the evaporator. The result is an immediate lowering of coefficient of performance due to ice building up from typically 3.0 to 2.4 i.e. a reduction of 20%. The performance deteriorates until ice prevents air movement and the equipment must be caused to defrost. This is typically achieved by reverting to cooling mode in order to pass hot gas through the outside air evaporator or by electric resistance elements. During the period of deforst and reduced performance alternative heating means such as electric resistance elements is required. As a result the heating cost for the building increases disporportionally as the demand for heating increases. In addition the demand for electric energy supply is suddenly increased.

As described in general terms above with respect to the second embodiment of FIG. 2, but in its heating mode, when operating as a reverse cycle heat pump, component (2) operates as a refrigerant condenser and component (3) operates as an evaporator taking heat from the return air after it leaves component (1).

Component (1) transfers heat from the return air into the supply air and the balance of heat in the return air is available for transferring into the evaporator component (3) to be "heat pumped" into the supply air from component (2) prior to entering the building from (17) in FIGS. 1 and 2. If recirculation and humidification is required, spray 9 and air valves 21 and 23 shown in FIG. 1 should be incorporated into the simplified arrangement of FIG. 2 Spray 8a would not be used in the heating mode.

By this means the heat pump can be maintained free of ice generally until the outside temperature is 2° C. The formation of ice from ambient air which is below about 1° C. is found in general experience with traditional heat pump systems to be quite small due to dryness of the outside air at those temperatures.

For the subject invention when operating in ambient conditions about 2° C, or below it is arranged that outside air is mixed with the return air. In FIG. 2 the air valves (23) and (24) can be adjusted for this condition. By this means the formation of ice can be minimised.

When ambient air is about −5° C. it is found that the condensate from the return air begins to form ice in the return air passages of component (1). However by this stage of ambient conditions the outside air is so dry as to build little ice when used alone (i.e. without return air mixed with it) through the evaporator component (3).

The heat pump performance deteriorates due to the low evaporating temperature needed to extract heat from the ambient air of −5° C. (Note. 2-stage heat pump systems can be considered for such low temperature climate conditions in order to obtain higher coefficients of performance.)

When the temperatures of outside air and return air in the return air passages of component (1) cause ice to form in those passages the system can be readily defrosted by the addition of heat to the water in the sump (7) which not only defrosts component (1) but also component (3) should that be required. Much of this heat is recovered in the supply air and the evaporator.

The water in the sump (7) can be heated by electric resistance elements or by hot water for solar energy panels and interconnected with the building's hot water system.

As a further source of heat from the building the return air ducting system can be interconnected with the kitchen and bathroom exhausts or from commercial and industrial processes whereby such otherwise wasted low grade heat can be redirected through the heat pump into the supply air. Such extra heat further reduces the ambient air temperature at which frost commences to form in the equipment and the subject invention is remarkable for the flexibility in collecting such energy.

A further feature of the FIG. 1 embodiment of this invention is the facility with which the supply air can be humidified by spraying the sump water (7) heated as previously described for defrosting purposes through sprays (9).

Assuming all such sources of heat are insufficient then it may be necessary to add further heating at component (28) so as to achieve the required temperature in the building.

From the above description it will be understood for climates having substantial periods of time below 7° there is considerable energy saving to be gained from the subject invention when compared with traditional air source heat pumps because the coefficient of performance can be maintained at a significantly higher level under all operating conditions than is achieved with the traditional system. In addition this invention's facility for collecting otherwise wasted heat is a significant advantage for it.

It should be noted that traditional air source systems through the need for frequency defrosting has a significant penalty as a result of cycling inefficiency. This is typically about 15%, but this loss can be largely avoided due to the postponement of defrosting to lower temperatures.

The optimising of overall performance in the subject invention can under some operating conditions be assisted by the use of air valves (21), (22), (23) and (24) in FIG. 1 which can allow the recycling of some return air back into the building.

It should be understood that the full efficiency and advantages of the invention for any situation are obtained when the settings of each of the variable components are in accordance with an optimisation programme which for example could be generated through a microprocessor.

Those knowledgeable in the art will understand for example that for cooling, the heat pump cooling and dehumidifaction process can be caused to operate independently of the indirect evaporation process by using a thermostat in the water sump which practically operates at the wet bulb temperature of the return air. By this means the humidity of the supply air can be largely controlled independently of its dry bulb temperature to meet the needs of the occupied space in the building.

It should also be understood that the principle of the invention is met and described in its simplest cooling form when the supply air comprises only outside air and exhaust air comprises only return air and the water distributor 9 and heaters 27 and 28 are omitted.

The principle of the invention is also met and described in its simplest heating form when the supply air comprises only outside air and exhaust air comprises only return air and the water distributors 8a, 8b and 9 with valves 10a and 10b are omitted and heaters 27 and 28 are omitted and drain valve 11 and drain to outside are omitted.

In the cooling form, coil 2 acts as an air cooler and coil 3 acts as an air heater by rejecting the heat from coil 2 and this is in accordance with a heat pump process.

In the heating form, coil 2 acts as an air heater and coil 3 acts as an air cooler by absorbing the heat required by coil 2 and this is in accordance with a heat pump process.

The claims defining the invention are as follows:

1. An air conditioning system, comprising:
   a first, air-to-air heat exchanger having an inlet for connection to a supply of outside air, a first, supply air flow path, and a second, return air flow path;
   a closed refrigeration system comprising second and third heat exchangers each comprising a refrigerant-to-air heat exchanger, and a heat pump;
   said second heat exchanger having an air flow path connected in series with the supply air flow path of said first heat exchanger, and an air flow outlet for connection to a space to be air conditioned;
   said third heat exchanger having an air flow path connected in series with the return air flow path of said first heat exchanger, and having an air flow outlet for connection to the exterior of a building to be air conditioned;
   connecting means for connecting said space to be air conditioned to the return air flow path of said first heat exchanger for returning air from said space to said heat exchanger; and
   air impeller means for causing air to flow through said supply air flow path of said first heat exchanger, then through the second heat exchanger and the space to be air conditioned, and for causing at least some of the return air from said space to flow through said return air flow path, through said third heat exchanger, and exhaust to atmosphere.

2. Air conditioning means according to claim 1 wherein the second of said heat exchangers is the evaporator of said closed refrigeration system and said third heat exchanger is the condenser of said refrigeration system.

3. Air conditioning means according to claim 1 wherein the second of said heat exchangers is the condenser of said closed refrigeration system and said third heat exchanger is the evaporator of said refrigeration system.

4. Air conditioning means according to claim 1 wherein said air impeller means comprises a fan arranged to pass supply air through said supply air flow path including said first heat exchanger and an exhaust fan arranged to exhaust return air from the return air flow path.

5. Air conditioning means according to claim 1 further comprising a sump below said air-to-air heat exchanger, water distribution means comprising sprays located above said air-to-air heat exchanger, and pump means coupling the sump to the sprays for effecting discharge of water through said return airflow path of said air-to-air heat exchanger.

6. Air conditioning means according to claim 5 comprising further water distribution sprays in said return air flow path but upstream of said third heat exchanger.

7. Air conditioning means according to claim 5 comprising further water distribution sprays in said supply air flow path and located between said first and second heat exchangers, said further water distribution sprays being coupled to said pump means.

8. Air conditioning means according to claim 1 wherein said supply air path comprises an inlet port having associated therewith an air inlet valve upstream of said first heat exchanger.

9. Air conditioning means according to claim 8 comprising a further air valve between said return and inlet air paths openable to allow passage of recirculating air from said return air path into said inlet air path.

10. A method of air conditioning comprising impelling an air flow through a supply air flow path of an air-to-air heat exchanger, through an air flow path of a second heat exchanger being a refrigerant-to-air heat exchanger of a closed refrigeration system of a heat pump, through a space to be air conditioned, and returning said air flow through a return air flow path of said air-to-air heat exchanger thereby exchanging enthalpy between said supply and return air flows, and discharging the return air through a third heat exchanger being another refrigerant-to-air heat exchanger of said closed system while operating the heat pump to cause flow of refrigerant through both said refrigerant-to-air heat exchangers functioning respectively in evaporator and condenser modes.

11. A method of air conditioning according to claim 10 comprising dehumidifying and cooling said air by operating the first said refrigerant-to-air heat exchanger in the evaporator mode of said closed refrigeration system.

12. A method of air conditioning according to claim 11 comprising cooling the return air in its passage from said return air flow path of the air-to-air heat exchanger by spraying water through said return air flow path and into a sump beneath said air-to-air heat exchanger.

13. A method of air conditioning according to claim 12 comprising passing water condensed from said air dehumidification into said sump.

14. A method of air conditioning according to claim 10 comprising heating said supply air by passing it through said supply air flow path of said refrigerant-to-air heat exchanger and passing it through the first said heat exchanger of said refrigeration system with that said heat exchanger operating in a condenser mode.

15. A method of air conditioning according to claim 14 comprising humidifying said supply air by imparting a spray of water into said air when in the supply air flow path between said air-to-air heat exchanger and said first refrigerant-to-air heat exchanger.

* * * * *